Sept. 13, 1955      R. BARRADELL-SMITH      2,717,474
APPARATUS FOR AND METHOD OF CONTINUOUSLY
FORMING A RIBBON OF GLASS
Filed Nov. 3, 1953      2 Sheets-Sheet 1
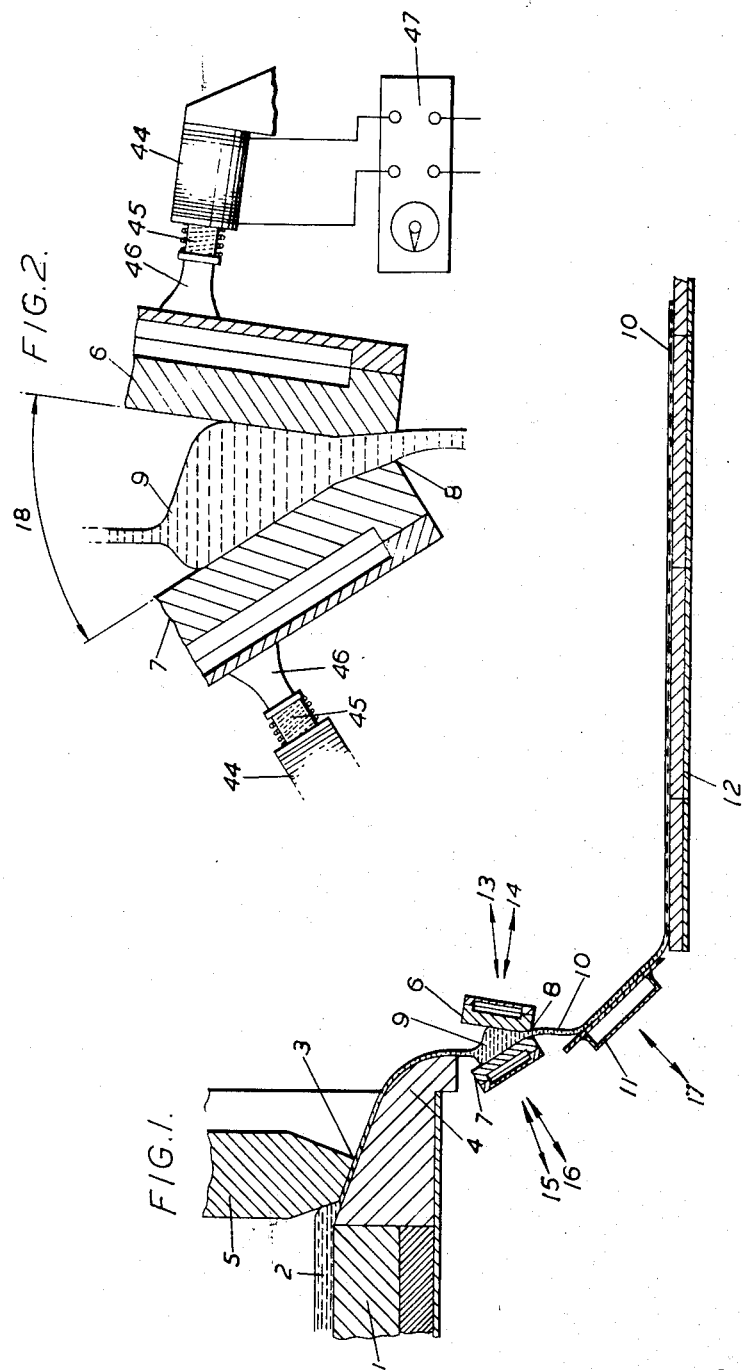
Inventor
Richard Barradell-Smith
By
Attorneys

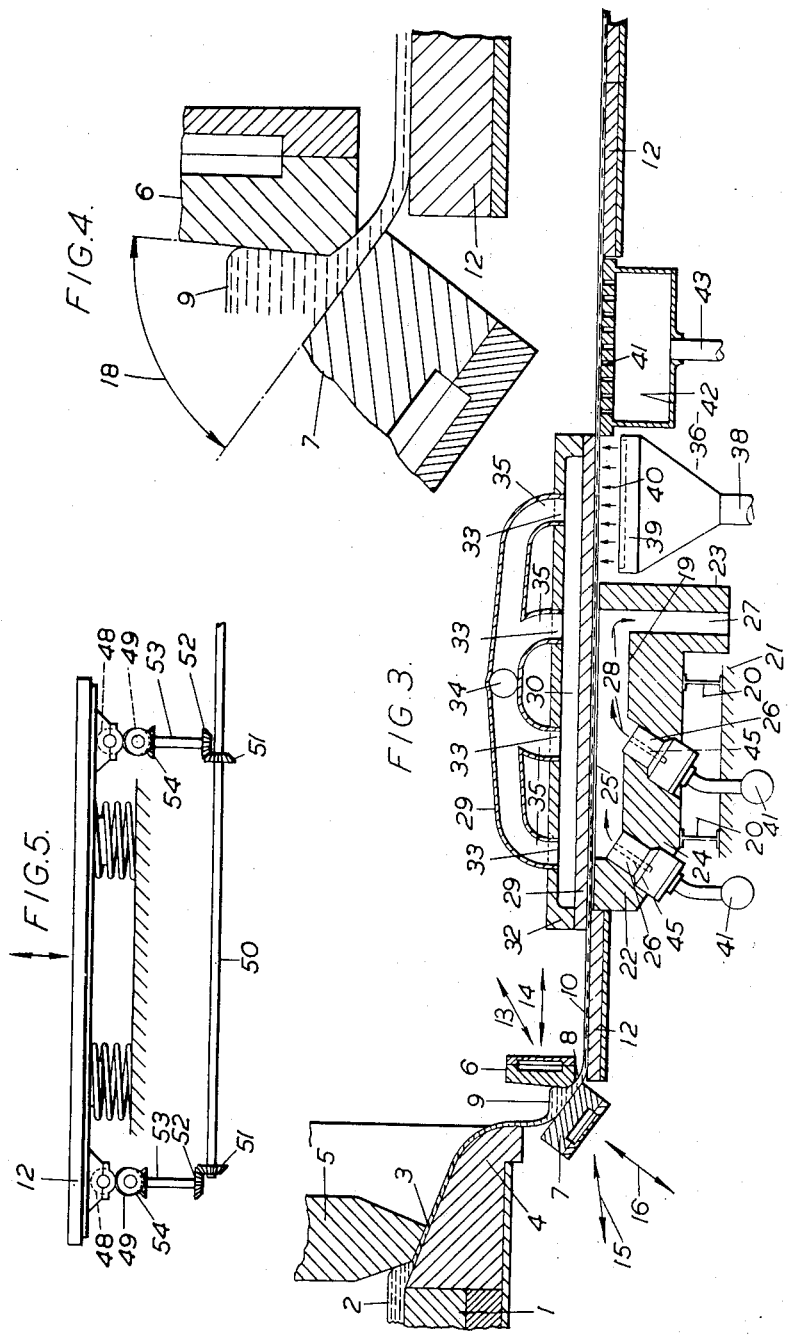

United States Patent Office 2,717,474
Patented Sept. 13, 1955

2,717,474

APPARATUS FOR AND METHOD OF CONTINUOUSLY FORMING A RIBBON OF GLASS

Richard Barradell-Smith, St. Helens, England, assignor to Pilkington Brothers Limited, Liverpool, England, a company of Great Britain Application November 3, 1953, Serial No. 390,023

Claims priority, application Great Britain November 12, 1952

4 Claims. (Cl. 49—3)

This invention relates to the manufacture of flat glass in continuous ribbon form.

In the manufacture of flat glass in continuous ribbon form a usual practice is to flow the molten metal from a spout of a tank furnace, in which the glass batch is melted, to the pass between casting rolls which are driven at a slow peripheral speed which is substantially the same as the speed of the ribbon of glass which emerges from the rolls. These rolls are of greater length than the dimension of the width of the ribbon, and as the ribbon passes between them squash it to the desired thickness. The rolls are mounted for mutual adjustment to regulate the distance between their peripheries which distance determines the thickness of the ribbon emerging from the rolls. This operation is sometimes referred to as "sizing."

During the operation of sizing the ribbon, the glass passes in intimate contact with the metal of the two rolls and accordingly a heat exchange is effected between the surfaces of the ribbon and the rolls so that the surfaces of the glass set as a result of the loss of heat by transfer to the rolls.

In Patent No. 2,539,398 there is a proposal to overcome the loss of heat to casting rolls by forming a ribbon of plastic glass somewhat thicker than desired in the finished form and passing the ribbon continuously in a substantially vertical direction between opposed cooled surfaces, the surfaces being plane and parallel with each other over an area comprising a material length of travel of the ribbon, and slightly diverging at the entrance end of the space between said surfaces, and vibrating the surfaces rapidly to and from each other and only along a substantially rectilinear line normal to the surface of the ribbon being formed at the mid-point of said surfaces, the nearest approach of the plane surfaces to each other being somewhat closer than the thickness of the ribbon to somewhat reduce the thickness of the ribbon and the vibrations being sufficiently rapid to produce many vibrations during the passage of any one portion of glass between said surfaces and sufficiently rapid to avoid injuring the surfaces of the glass.

A main object of the present invention is to provide an improved method of operation and apparatus therefor, which eliminates the usual sizing operation in the manufacture of flat glass in continuous ribbon form and minimises heat exchange between the glass and the sizing means, whereby the glass is sized whilst of low viscosity and accordingly sets mainly by reason of loss of heat sustained by radiation and by heat exchange with a gaseous medium.

In the manufacture of a ribbon of glass of predetermined width (such as 270 cms.) from molten glass flowing from a spout of a glass melting furnace in the form of a ribbon, according to the present invention, a pool of the molten glass is formed immediately below the spout, between vibrated confining means opening to a short die, so that the latter is gravity fed from the pool, the outlet from the die having a width substantially equal to the intended thickness of the eventual ribbon and a length which is greater than the width of the eventual ribbon, the rates of flow of molten glass into the pool and through the die being such that the depth of the pool is substantially constant, the frequency and amplitude of the vibrations imparted to the pool confining means and die being such that the molten glass cannot follow them, and the depth of the pool being such that the ribbon emerging from the die is a "low viscosity" glass. By low viscosity glass is meant glass of which the viscosity is low as compared with the viscosity of a formed ribbon of glass leaving the usual casting rollers.

The present invention also comprises apparatus for continually forming a ribbon of glass of predetermined and substantially constant width (such as 270 cms.) which apparatus is characterised by the combination with a spout of a glass melting furnace, having a gate for regulating the volume of flow therefrom, of two divergent plates spaced apart immediately below the spout to constitute a virtual funnel for the glass, the bottom ends of the plates converging to form a sizing die for glass leaving the funnel, said die being of a length which is short in relation to the height of the funnel, and predicates the eventual thickness of the ribbon being formed, vibrating means operatively associated with each of the plates, and actuating means therefor whereby the frequency of the vibrations imparted to the plates during the sizing of the ribbon is such that the molten glass between the plates and in the sizing die cannot follow the movements of the plates, the rates of feeding glass from the spout and of discharge from the die being such that a pool of substantially constant volume is formed in the funnel thereby affording a constant gravity feed from the funnel to the die.

The present invention, therefore, is to be distinguished from prior proposals by the employment of the pool of substantially constant volume and the formation of the short die which is fed from the pool. The depth of the pool in the virtual funnel is such that it has sufficient volume to have a substantially constant volume, in spite of the small variations in mass flow from the spout. By limiting the size of the pool to that which produces a constant flow to the die, the area over which the glass has to travel to the die is minimised, and the die being as short as possible the heat exchange in the area of the die is minimised. Accordingly, the loss of heat in that volume of the glass where the area of the surface is greatest in relation to its volume, is minimised. Thus the glass emerges in sized condition as low viscosity glass.

Accordingly, as the glass sets and travels towards the lehr, the pull on the glass in the lehr is not transmitted to the glass in the die, so that the ribbon produced is of substantially constant dimensions.

The die may be disposed vertically so that the ribbon emerging from the die is supported by a vibrated member which deflects the ribbon into a horizontal path leading to a lehr, the member being vibrated at a similar frequency to that imparted to the pool confining members, and the axis of vibration being normal to the ribbon as it is turned towards the horizontal path. Alternatively, the die may be so directed that the ribbon of low viscosity glass emerging from the die can flow directly on to a table leading to a lehr.

If the die is vertically disposed, a flat deflecting member may be arranged below the die for smoothly guiding the emerging ribbon into a horizontal plane leading to a lehr, vibrating mechanism being operatively associated with the member to impart vibrations at a frequency similar to that applied to the plates forming the virtual funnel and the axis of the vibrations being normal to the surface of the deflecting member.

Whether the ribbon of glass flows directly to the table or passes over a deflecting member in travelling to the table, the latter may be associated at the end nearer the die with a heating chamber structure supported under the ribbon, passing along the horizontal plane towards the lehr, thereby forming with the moving ribbon a substantially closed heating chamber, means for forming a sheet of flame within the chamber and for directing the flame towards the undersurface of the ribbon to move in spaced parallelism therewith so that the under-surface of the ribbon is swept by the flame, a suction plate member, having air passages therethrough, located above the path of the ribbon in the vicinity of the heating chamber and in an extension thereof disposed forwardly of the heating chamber, a cover to the suction plate member and extension, means for forming a vacuum within the cover, the total suction force to which the glass is subjected being such that the ribbon can be advanced in contiguity with the suction plate member, and means for directing an air flow against the under-surface of the glass to chill the under-surface before it leaves the suction plate. Such a construction is described in patent application No. 359,546, filed June 4, 1953.

In order that the invention may be more clearly understood, some preferred embodiments thereof will now be described by way of example with reference to the accompanying diagrammatic drawings which illustrate apparatus in which the direction of the major components of the vibration imparted to the plate is to and from the glass.

Figure 1 is a diagram showing, by means of a vertical section one embodiment, and Figure 2 is an enlarged view of the pool-forming plates and the associated ribbon-forming die.

Figure 3 is a diagram similar to Figure 1 showing the second embodiment, and

Figure 4 is an enlarged view, similar to Figure 2, showing pool-confining plates and the ribbon-forming die included in Figure 3.

Figure 5 is a diagrammatic sectional elevation showing an alternative means of vibrating the table.

In the drawings like references designate the same or similar parts.

As illustrated in Figure 1 of the drawings a discharge canal 1 constraining a flow of molten glass 2 from a melting tank (not shown) is provided with an outflow orifice 3 through which the molten glass is discharged over the lip of the spout 4. The rate of flow of the glass over the lip is determined by the setting of the vertically adjustable gate 5 to regulate the height of the orifice 3. The glass flowing over the spout 4 falls under gravity into a virtual funnel formed immediately below the lip of the spout between two pool-forming plates 6 and 7 which constitute front and rear walls to a funnel and converge downwardly to a narrow discharge die 8 at the bottom. The size of the die 8 is such, in relation to the size of the outflow orifice 3, that a pool 9 of molten glass of substantially constant volume is formed in the funnel between the downwardly converging forming plates 6 and 7. From the die 8 the glass flows as a ribbon 10 of the desired thickness and passes on to an inclined plate 11 and thence on to a plane support 12 along which the glass is passed in known manner to an annealing lehr (not shown). The forming plates 6 and 7 and the plate 11 are water cooled. From the foregoing it will be observed that there are no side walls used in conjunction with the plates 6 and 7, and that the volume of glass in the funnel and the speed of flow therethrough is such that the height of the pool produced assures at the die the formation of a ribbon of the desired width. Side plates for the funnel may be employed to act as shields for the body of glass in the pool.

In accordance with this invention the forming plates 6 and 7 are continuously vibrated. To this end each plate is either connected to the solenoid of an electromagnet or is vibrated mechanically as hereinafter explained. This vibration of the plates is in a general direction towards and away from each other and is at a suitably high rate. Thus the axis of vibration of the plate 6 may be anywhere between the limits indicated by the double arrow 13 and 14, while that of the plate 7 is anywhere within the range 15, 16; and a suitable rate of vibration is one hundred oscillations per second. Similarly, the plate 11 may be vibrated along the axis 17. Thus the glass emerging from the die has "fire finished" surfaces.

Referring now to Figure 3, it will be seen that this apparatus differs from that shown in Figure 1, simply by the omission of the plate 11, the viscous ribbon flowing from the die 8 moving directly on to the plane support 12.

In each apparatus illustrated the forming plates are in close proximity to the lip of the spout in order to avoid the glass folding on itself after leaving the spout so that the general flow of the glass is always downwards until it reaches the plane support 12.

The function of the vibrations is to reduce the transfer of heat from the glass to the plates, and experiments with the apparatus described have shown that there is a certain critical value of acceleration of the plates below which this desired reduction of heat transfer does not take place owing to the fact, as is at present thought, that the glass is then able to follow the plates, remaining in contact with them instead of "bouncing" upon them. Whether or not this theory be correct, the experiments show that there is a critical minimum value of the acceleration below which the process fails to operate successfully, and that this value is of the order of 9 g, that is to say nine times gravity or about 290 feet per second per second. Assuming a simple harmonic vibration, then the acceleration is proportional to the product of the amplitude and the square of the frequency. The frequency and amplitude are thus interdependent, lower frequencies requiring larger amplitude, and vice versa, in order that the acceleration may be sufficient. Experiments have shown that a frequency of 100 vibrations per second with an amplitude of 1 mm., giving a total range of movement of each plate of 2 mms., gives very satisfactory results. This gives an acceleration of 15 meters per second, or approximately 15 g. Frequencies of 50 and 360 vibrations per second have also been tried, and have proved effective if the amplitudes are adjusted accordingly to give the necessary acceleration. By such manner of operation the molten glass flows through the die 8 in a really fluid state the temperature being of the order of 900° C., and the motive force is principally gravity.

As to the directions of the axes of vibration, the approximate limits of those of the forming plates have been indicated on the drawings by the arrows 13—14, 15—16, and it will therefore be understood that these angles are not sharply critical and the reason is the fluid state of the glass in the pool. On the other hand, the vibrational axis of the control plate 11 is important, the ribbon being now much more viscous, and this axis shall be normal to the surface of the plate or slightly inclined in the forwardly propelling direction; but it must not be inclined rearwardly.

As clearly shown in Figs. 2 and 4 the die is defined by two near-parallel planes, which are at an angle of 16 degrees to each other in Figure 2 and at an angle of 13 degrees to each other in Figure 4. The near-parallel die 8 is made as short as possible in order to minimise the rate at which heat is abstracted from the glass, especially because it is at this point that the glass has the greatest surface area in relation to its volume. On the other hand, if it be too short then control is lost over the uniformity of thickness of the ribbon. Experiments suggest that a length of 10 mms., is most suitable to effect control when a ribbon of soda lime glass is being produced while a length of 25 mms. seems too much, whatever the glass composition, because of its excessive cooling effect.

The funnel angle 18 is not critical and may be varied by as much as 60 degrees.

The size of the pool 9 between the forming plates is important. If it is too small it is difficult to prevent large fluctuations in its size, with consequent instability in operation and variations in the glass ribbon which is being produced and if it is too large the outer skin of the mass of molten glass travels for so great a distance in contact with the plates that it is chilled excessively, and this spoils the ribbon.

In the funnel formed by the plates 6 and 7 the temperature is of the order of 1000 degrees centigrade, which gives the glass in the pool 9 a viscosity of only 20,000 poises. Gravity being the principal propulsive agent moving the glass through the gap between the plates, the glass must be really fluid immediately prior to forming the ribbon, and the plates must be shaped and set so that there is a large component of gravity acting so as to propel the glass between them.

In order to assure a "fire finish" on both surfaces of the ribbon of glass being produced, for example in the manufacture of clear flat glass (window glass or plate glass) the under-surface may be given that finish, by a superficial remelting after the ribbon has travelled a little way along the plane support 12 and then air chilling the melt as now to be described with reference to Figure 3 of the drawings. However, such a remelting and chilling apparatus may be incorporated in the installation illustrated in Figure 1.

In the installation shown in Figure 3 the series of plane supports 12 is interrupted to accommodate a heating chamber structure 19 which extends across the full width of the ribbon 10 and is supported on joists 20 carried on a suitable support indicated at 21. The heating chamber comprises a rear end wall 22 and a forward end wall 23 the disposition of the chamber being such that there is sufficient space between the wall and the under-surface of the ribbon to permit free passage of the ribbon over the heating chamber 19 in contiguity therewith, thereby a virtually closed heating chamber is provided opening to the under-surface of the ribbon.

The heating chamber structure comprises in addition to the end walls 22, 23 a floor 24 and two side walls 25, only one of which is shown, thereby defining the chamber 19 within the structure. The structure is provided with wide slots 26 to accommodate burners, which burners each produce a sheet of flame which sweeps the whole under-surface of the ribbon, in the direction of the moving ribbon. An outlet for the burnt gases is indicated at 27 and the general flow of the flame is indicated by the arrows 28 from which it will be appreciated that the flame from each of the burners arranged on the two slots 26 moves in substantial parallelism with the ribbon, the flame from each burner being in nature a sheet of flame which progressively sweeps the surface of the moving ribbon as it passes through the heating chamber 19. Thereby the under-surface of the ribbon can be remelted by the heat produced from the sweeping sheet of flame imparting heat at least in compensation for the loss of heat suffered by the ribbon whilst on the support 12. The side walls of the chamber may rise beyond the sides of the ribbon.

In order to maintain the ribbon on its predetermined horizontal path during its passage over the heating chamber there is disposed above the ribbon a suction plate 29 forming the floor of a suction chamber 30 comprised within a roof element 31 having a peripheral flange 32 which internally engages the suction plate 29 and is secured thereto by fixing elements, not shown.

The roof element 31 is apertured as indicated at 33, and a manifold 34 with branches 35 is connected to the suction chamber 30, the manifold being connected to an exhaust fan or pump for maintaining the desired degree of vacuum on the suction chamber 30, which is such as to hold the ribbon to the suction plate 29 and yet permit passage of the ribbon across the plate as it advances towards the annealing lehr.

The suction plate 29 may be formed of porous material e. g. formed of a suitable sintered material e. g. sintered stainless steel or ceramic material, or the plate 29 may be apertured to the extent desired to provide the requisite suction area on the ribbon 10 to hold the latter in moving contact with the plate 29.

Disposed ahead of the heating chamber is means, generally indicated at 36 for producing a chilling effect on the undersurface of the ribbon 10 immediately after it leaves the heating chamber 19.

In the construction illustrated, the chilling means 36 is constituted by a trough-shaped funnel 37 provided with a supply pipe 38 through which air of the desired temperature is supplied, and the mouth of the funnel 37 is provided with an apertured plate 39 through which streams of air emerge as indicated by the arrows 40. Thus the remelted under-surface of the ribbon 10 is permitted to set again solely by loss of heat by radiation and by heat exchange with the air, so that a fire finish is achieved and so that sufficient hardness is given to the surface before the advancing ribbon reaches the forward supports 12 which carry the ribbon, as it moves forward.

The length of the plate 39 will correspond to the distance between the heating chamber 19 operating on the under-surface of the ribbon 10 and the supporting member 12 next ahead of the chilling means 36 and the width thereof will correspond to the width of the ribbon.

A plurality of chilling means may be employed where the distance between the heating chamber 19, and the support 12 ahead thereof are spaced apart at such a distance as to make uneconomical the employment of one funnel 37, and to regulate the rate of chilling, valves may be provided in the supply lines such as 38 so as to avoid too sudden a chilling of the remelted under-surface.

In the apparatus described the suction plate 29 includes an extension disposed forwardly of the heating chamber 19 so that the ribbon immediately beyond the chamber 19 is maintained in the prescribed horizontal path by the suction applied through the extension overlying the chilling means 36.

From the foregoing it will be understood that the under-surface of the ribbon is subjected to the air streams 40 which effect a heat exchange assuring the production of the required fire finish on the undersurface of the ribbon, and prevent injury to the fire finished surface produced by the heating chamber 19, when moving over the supporting members 12 ahead of the chilling means.

However the supporting member 12 next ahead of the chilling means 36 may be constituted by a porous plate, as for example, a plate formed from a suitable graphite compound, or a plate with apertures as indicated at 41, and a chamber 42 provided with an inlet 43 through which a gaseous medium, for example, air, is supplied under pressure, in order to achieve the formation of a frictionless gaseous film between the ribbon 10 and the support. Thus a cushion of air is provided between the ribbon and the aperture supporting plate 41, which cushion assists in preventing any damage to the fire finished under-surface of the ribbon 10 during its advance. The horizontal supporting member 12 between the heating chamber and the plates 6, 7 may be similarly constructed.

The width of the heating chamber 19 is such that when the burners are accommodated therein the slot 45 of each burner extends across the full width of the ribbon 10.

In Figure 2 is illustrated electrical means for vibrating the plates 6 and 7. The electrical means comprises solenoids 44, the armature 45 of which are attached, as indicated at 46, to the respective plates 6 and 7 as the case may be, and each solenoid 44 may be electrically connected with a frequency changing apparatus generally indicated at 47 in association with the solenoid 44 for operating the plate 6. Such form of vibrating means also may be employed to actuate the plates 6, 7 shown in the construction illustrated in Figures 3 and 4.

Alternatively the plates 6, 7 in either form of construction and also the plane member 12, disposed between the heating chamber structure and the plates 6, 7, in the Figure 3 arrangement may be mechanically vibrated; and in Figure 5, by way of example, a mechanical means of vibrating the plane member 12 is diagrammatically illustrated.

In such construction, the plane member 12 is provided with rollers 48 at each side, which rollers ride on cams 49 mounted on axes parallel to the axes of the rollers 48. The cams are rapidly rotated at the desired rate from a power driven shaft 50 carrying bevels 51 which mesh with bevels 52 fixed to spindles 53, each carrying one element 54 of a bevel pair, the other element of each pair being fixed on the axle member carrying the respective cam 49.

Springs 55 are preferably disposed between the plane member 12 to which they are attached and a support 56 as indicated in Figure 5 and are tuned to resonate with the plane member at the desired frequency.

By synchronously operating the cams, the plane member 12, disposed between the heating structure and the plates 6, 7, can be wholly vibrated at the desired frequency in a vertical plane, and as already mentioned similar mechanism may be employed for operating the plates 6, 7 in the construction shown in Figure 3 or the plates 6, 7 shown in the construction illustrated in Figure 1.

By the use of apparatus constructed in accordance with the invention as hereinbefore described, relatively simple, but effective means are provided for sizing a ribbon of glass as it flows from a spout fed from a reservoir of molten glass, the sizing operation being effected in such a manner that the chilling of the two surfaces of the ribbon is substantially effected by heat exchange with air only, thereby making possible the continuous production of a ribbon of flat glass having a fire finish on one or both surfaces, whether it is a "slow setting" glass or a "quick setting" glass.

By "slow setting" glass is meant a glass having in its composition a low silica ($SiO_2$) content, e. g. 70%, and a low lime (CaO) content, e. g. 4%, and the expression "quick setting" glass is meant to include plate glass and window glass, and the invention can be successfully applied to the production of a ribbon of an opaque glass of that type sold on the open market under the trademark Vitrolite, as well as to the production of clear flat glass.

I claim:

1. In the manufacture of a ribbon of glass of predetermined width (such as 270 cms.) from molten glass flowing from a spout of a glass melting furnace in the form of a ribbon, forming a pool of the molten glass immediately below the spout between confining means opening to a short die so that the latter is gravity fed from the pool, the outlet from the die having a width substantially equal to the intended thickness of the eventual ribbon and a length which is greater than the width of the eventual ribbon, adjusting the rate of flow of molten glass into the pool so that the depth of the pool is substantially constant, and in such that the ribbon emerges from the die as a "low viscosity" glass, and vibrating said pool confining means and die at such frequency and amplitude that the molten glass cannot follow them.

2. In the manufacture of a ribbon of glass of predetermined width according to claim 1 supporting the emerging ribbon on a vibrated member which deflects the ribbon into a horizontal path, the member being vibrated at a similar frequency to that of the confining means, the axis of vibration being normal to the ribbon as it is turned towards the horizontal path.

3. Apparatus for continually forming a ribbon of glass of predetermined and substantially constant width (such as 270 cms.) characterized by the combination with a spout of a glass melting furnace, having a gate for regulating the volume of flow therefrom, of two divergent plates spaced apart immediately below the spout to constitute a virtual funnel for the glass, a sizing die formed by the bottom converging ends of the plates, for glass leaving the funnel, of a length which is short in relation to the height of the funnel, said die predicating the eventual thickness of the ribbon being formed, vibrating means operatively associated with each of the plates, actuating means therefor whereby the frequency and amplitude of the vibrations imparted to the plates during the sizing of the ribbon is such that the molten glass between the plates and in the sizing die cannot follow the movements in the plates, the rates of feeding glass from the spout and of discharge from the die being such that a pool of substantially constant volume is formed in the funnel thereby affording a gravity feed to the die.

4. Apparatus for continually forming a ribbon of glass of predetermined and substantially constant width according to claim 3, comprising a deflecting member for smoothly guiding the emerging ribbon into a horizontal plane, and vibrating mechanism operatively associated with such member, the axis of the vibrations being normal to the surface of the deflecting member.

References Cited in the file of this patent

UNITED STATES PATENTS

| | | |
|---|---|---|
| 1,469,383 | Crowley | Oct. 2, 1923 |
| 1,623,051 | Fraser | Apr. 5, 1927 |
| 2,539,398 | Bowes | Jan. 30, 1951 |